United States Patent [19]
Sullivan et al.

[11] Patent Number: 5,170,446
[45] Date of Patent: Dec. 8, 1992

[54] ROTATIONAL OPTICAL SWITCH

[75] Inventors: Jackie C. Sullivan, Wendell; Edwin R. Newell, Wake Forest; Keith D. Wheeler, Raleigh; Stanley H. Edwards, Jr., Raleigh, all of N.C.

[73] Assignee: Square D Company, Palatine, Ill.

[21] Appl. No.: 707,888

[22] Filed: May 31, 1991

Related U.S. Application Data

[63] Continuation-in-part of Ser. No. 676,125, Mar. 27, 1991, abandoned, which is a continuation-in-part of Ser. No. 635,841, Dec. 31, 1990, which is a continuation-in-part of Ser. No. 242,359, Sep. 9, 1988, Pat. No. 4,911,517.

[51] Int. Cl.$^5$ .......................... G02B 6/00; G02B 6/36
[52] U.S. Cl. ...................................................... 385/19
[58] Field of Search ............................. 385/18, 19, 20

[56] References Cited

U.S. PATENT DOCUMENTS

| | | | |
|---|---|---|---|
| 4,470,662 | 9/1984 | Muhzhiu | 385/19 |
| 4,556,280 | 12/1985 | Bagby | 385/19 |
| 4,726,646 | 2/1988 | Tanaka et al. | 385/19 |
| 4,878,729 | 11/1989 | Stewart | 350/96.18 |
| 4,903,337 | 2/1990 | Newell et al. | 455/605 |
| 4,911,517 | 3/1990 | Newell et al. | 350/96.20 |

Primary Examiner—Akm E. Ullah
Attorney, Agent, or Firm—D. Russell Stacey; Hugh M. Gilroy

[57] ABSTRACT

The rotational optical switch of the present invention includes a switch enclosure, a light conductor, an optical shutter, a torsion spring biasing the shutter towards a bistable state, and a shutter actuator. The switch enclosure generally encloses the remaining components. The light conductor is received in the switch enclosure and extends between the enclosure and a transceiver, which provides a signal reflective of the state of the optical shutter. The optical shutter is pivotally mounted within the switch enclosure and is bistable between a reflective state which reflects light into the light conductor, and a nonreflective state which does not reflect light into the light conductor. The shutter pivots on arms to either end of a support cylinder which have knife edges. The shutter actuator is pivotally connected to the optical shutter by the torsion spring to cause the optical shutter to snap between the bistable states. The optical shutter has two reflectors in opposite reflective states. A second conductor is always in the opposite reflector condition.

46 Claims, 3 Drawing Sheets

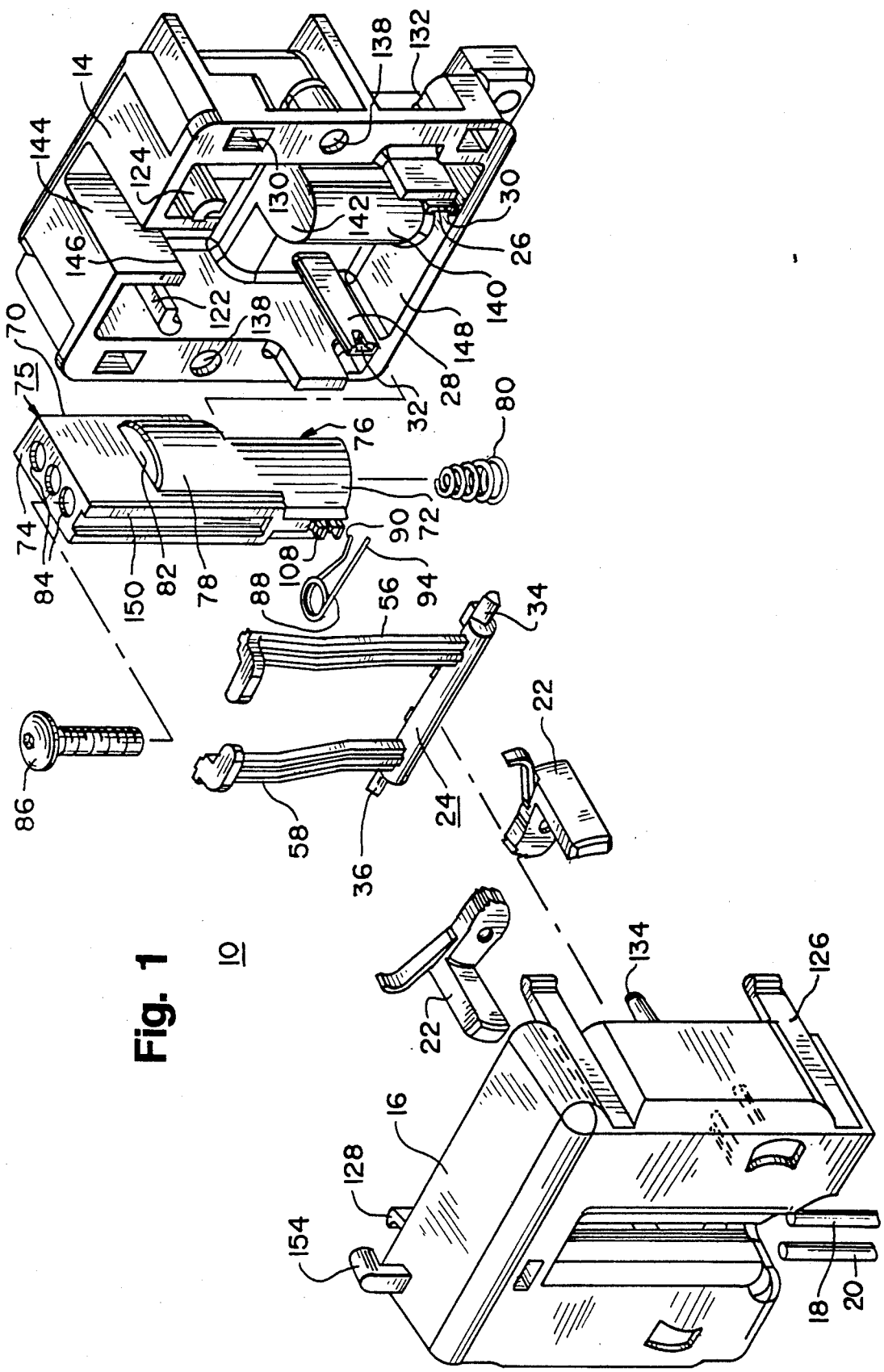

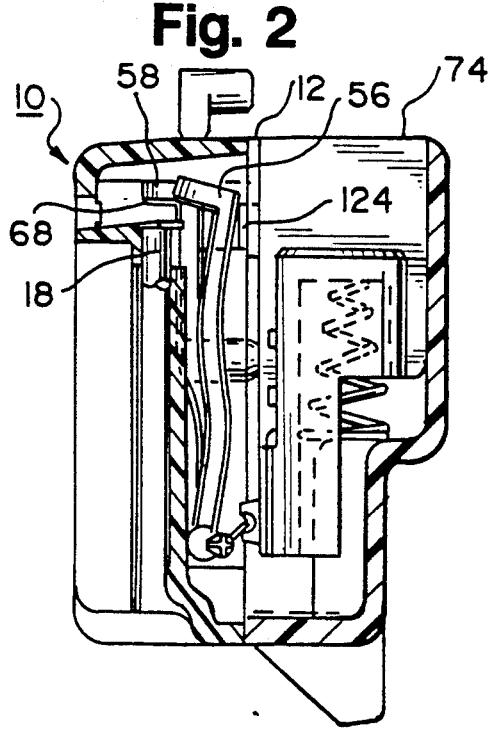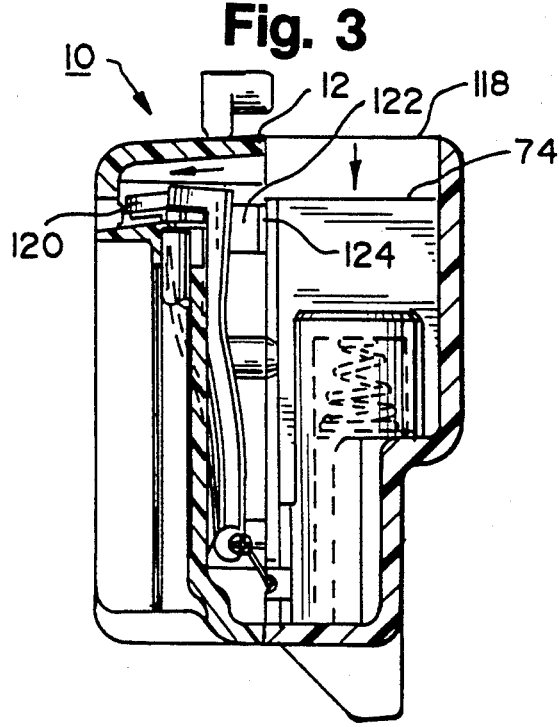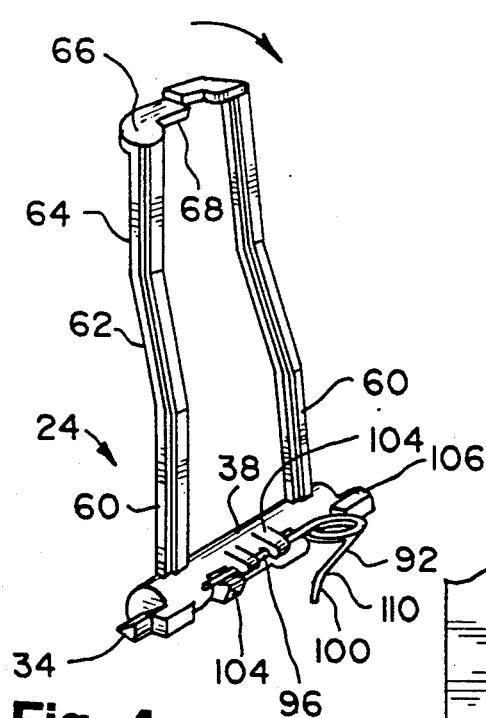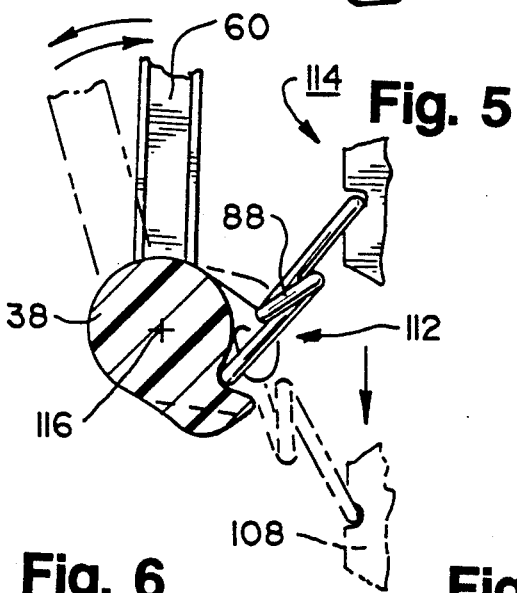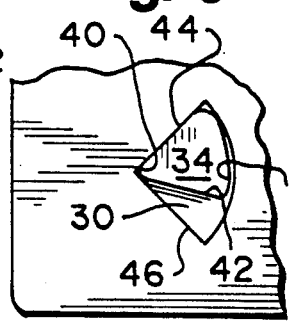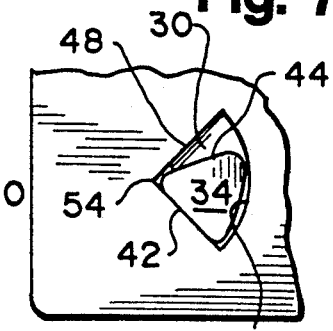

ROTATIONAL OPTICAL SWITCH

RELATED APPLICATIONS

This application is a continuation-in-part of 07/676,125, filed on Mar. 27, 1991, now abandoned, which is a continuation-in-part of 07/635,841, filed on Dec. 31, 1990, now being allowed, which is a continuation-in-part of 07/242,359, filed on Sep. 9, 1989, now U.S. Pat. No. 4,911,517.

BACKGROUND OF THE INVENTION

This invention relates to optical switches and particularly relates to optical switches employing reflectors which selectively reflect light into a fiber optic cable or light conductor by rotating between bistable positions. Typically, these reflective switches are used in conjunction with an optical signal transceiver which generates a light beam transmitted through the fiber optic cable and senses a return signal to determine whether or not a reflector at an opposite end of a cable is reflecting any substantial portion of the light.

Optical signals have a number of advantages over electrical signals in certain circumstances, particularly those involving potential hazards. There is no electric shock potential from an optical signal nor can an optical signal spark to ignite a flammable or explosive environment. As a result, optical signals are particularly useful in NEMA Classes 7 and 9 and NEC Classes 1 through 3 Division One and Division Two. Optical signals are also relatively immune to dampness and electromagnet interference. Examples of such transceivers and switches are shown by U.S. Pat. No. 4,878,729 and U.S. Pat. No. 4,903,337.

U.S. Pat. No. 4,878,729 issued to David G. Stewart on Nov. 7, 1989 describing an OPTICAL SWITCH and assigned to the assignee of the present invention.

U.S. Pat. No. 4,903,337 issued to Edwin R. Newell et al on Feb. 20, 1990 describing a FIBER OPTICAL TRANSCEIVER and is assigned to the assignee of the present invention.

Each of the foregoing patents and applications owned by Square D Company are incorporated herein by reference.

SUMMARY OF THE INVENTION

The rotational optical switch of the present invention includes a switch enclosure, a light conductor, an optical shutter, a shutter bias means for biasing the shutter towards a bistable state, and a shutter actuator. The switch enclosure generally encloses the remaining components. The light conductor is received in the switch enclosure and extends between the enclosure and a transceiver, which provides a signal reflective of the state of the optical shutter. The optical shutter is bistable between a reflective state which reflects light into the light conductor, and a nonreflective state which does not reflect light into the light conductor which is pivotally mounted within the switch enclosure. The shutter bias means is for biasing the optical shutter towards one of the bistable states. The shutter actuator is operatively connected to the optical shutter to cause the optical shutter to change between the bistable states.

BRIEF DESCRIPTION OF THE DRAWING

FIG. 1 is an exploded perspective view of the rotational optical switch of the present invention.

FIG. 2 is a cross sectional view of the present invention in an unactuated position.

FIG. 3 is a cross sectional view of the present invention in an actuated position.

FIG. 4 is a perspective view of the optical shutter of the present invention and an associated component.

FIG. 5 is a cross sectional view partially in phantom, intended to illustrate the interaction among various components of the present invention.

FIG. 6 illustrates an interaction between a pivot arm of the optical shutter and a pivot arm hole within which the arm rotates in the actuated position.

FIG. 7 illustrates an interaction between a pivot arm of the optical shutter and a pivot arm hole within which the arm rotates in the nonactuated position.

DETAILED DESCRIPTION OF THE DRAWING

Figure 8:
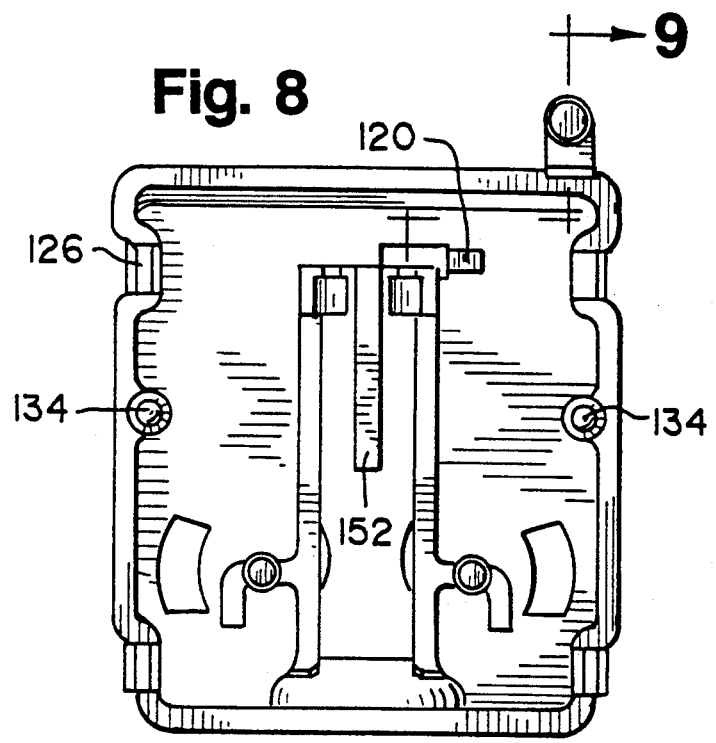
FIG. 8 is an interior view of the switch cover of the present invention.
Figure 9:
FIG. 9 is a sectional view of FIG. 8 along the lines 9—9.

The rotational optical switch 10 of the present invention is shown in an exploded view in FIG. 1 of the drawing. Optical switch 10 includes a switch enclosure 12 shown assembled in FIGS. 2 and 3, including a switch housing 14 and a switch cover 16 shown discretely in FIG. 1. First light conductor 18 and second light conductor 20 are received in the exterior of cover 16 and retained in place by cable clamps 22 as shown in parent application Ser. No. 07/635,841. However the spring is presently being moved to the rear of the clamp opposite the teeth. Optical shutter 24 is mounted inward of cover 16 on first shutter post 26 and second shutter post 28. Each shutter post 26,28 extends from housing 14 towards cover 16 and contains a first pivot hole 30 and a second pivot hole 32 at their respective distal ends. First pivot hole 30 supports first pivot arm 34 and second pivot hole 32 supports second pivot arm 36 for limited rotational movement between two bistable states.

First and second pivot arms 34,36 are substantially identical and may best be viewed in FIGS. 6 or 7. Each pivot arm 34,36 extends outward from an end of support cylinder 38. Basically, each pivot arm is shaped similar to a pie wedge and includes a knife edge 40, an arm reflective flat 42 and an arm nonreflective flat 44. Arm reflective flats 42,44 cooperate with arm hole reflective flat 46 and hole nonreflective flat 48 to delimit rotation of optical shutter 24 in cooperation with other structure to serve as stop means for positioning shutter 24 in a reflective or nonreflective position. Similarly to pivot arms 34,36, the structure of first and second pivot holes 30,32 is substantially the same. Each, for example, terminates its respective flats with a semi circumferential termination. Pivot arm 34 is terminated by arm termination 50 opposite knife edge 40. Hole 30 is terminated by hole termination 52 opposite hole apex 54. There is a slight difference in radii between arm termination 50 and hole termination 52 to preserve the low friction movement of shutter 24 provided by the movement of shutter 24 on knife edge 40 in apex 54. This structure acts as minimum surface means for reducing friction and for providing pivotal mounting of shutter 24.

A first reflector arm 56 extends generally radially outward from support cylinder 38 adjacent to first pivot arm 34. Similarly, a second reflector arm 58 extends radially outward from support cylinder 38 adjacent to second pivot arm 36. Each reflector arm 56,58 has similar structure and identical components. A first radial reflector arm 60 extends radially from support cylinder 38 near the respective pivot arm. A displacement arm 62 is angled in the plane of rotation of the reflector arms extending further outward from said first radial reflector arm 60. Extending outward from displacement arm 62 is a second radial reflector arm 64 which is generally parallel to said first radial reflector arm 60. Reflector 66 is mounted at the outer most portion of each reflector arm 56,58. Each reflector 66 has a reflective surface 68 facing towards said support cylinder 38 and extending axially inward towards an opposite axial end of said support cylinder 38. Displacement arms 62 sufficiently separate reflectors 66 so that in either bistable state only one of the reflectors 66 is in a reflective state where as the other reflector 66 is in a nonreflective state. Reflective surface 68 can be achieved in a variety of ways, but it is preferred that 3M reflective tape Model 7610 be used.

Inward of optical shutter 24 is shutter actuator 70 which is generally elongated and has an interior end 72 and an exterior end 74. Interior end 72 generally includes an open semicylinder having an opening of about 180 degrees or greater. The open semicylinder 76 extends towards the exterior end 74 where it terminates in an actuator tube 78. The exterior end 74 of shutter actuator 70 is generally a rectangular post 75 which generally terminates in the region of actuator tube 78. Portions of the narrower sides of rectangular end 74 extend outward of tube 78 and downward towards the interior end 72. A conical actuator spring 80 is partially encircled by open semicylinder 76 and partially received within actuator tube 78. Actuator tube 78 is closed towards the exterior end 74 of the actuator. The closure acts as an actuator stop 82 in cooperation with structure on switch housing 14. At the exterior end 74 of actuator 70 are a plurality of bearing holes 84. Bearing screw 86 is selectively received in a bearing hole 84 to adjust the coupling between optical switch 10 and actuation structure not shown associated with the mechanism to be monitored. Torsion spring 88 lies between shutter 24 and shutter actuator 70. Torsion spring 88 includes a spring actuator end 90 at one end of an actuator leg 92. A spring shutter end 94 is at one end of shutter leg 96. Legs 92 and 96 are joined at a coiled end 98. Actuator leg 92 extends from coil end 98 to spring actuator end 90 and includes an angled length 100 between spring actuator end 90 and joinder length 102. Shutter leg 96 snaps into place in a number of torsion tabs 104 to form a pivotal connection between torsion spring 88 and shutter 24. At the coil end 98 and opposite shutter end 94 are spring stop tabs 106 which tends to restrain axial movement of the shutter leg 96 with respect to shutter 24 during assembly of optical switch 10. Analogously actuator 70 has a plurality of actuator tabs 108 into which the joinder length 102 of actuator leg 92 snaps to form the pivotal connection with actuator 70. Apex 110 between joinder length 102 and angled length 100 fits about the semicircular barrel of actuator 70 to restrain axial movement between actuator leg 92 and actuator 70 and fix torsion spring 88 axially. Tabs 104, 106 collectively serve as shutter pivot mount 112 and tabs 108 serve as an actuator pivot mount 114 to provide a pivotal connection at each end of torsion spring 88. Shutter 24 only rotates rather than translates within switch enclosure 12. In contrast, shutter actuator 70 only translates and does not rotate within switch enclosure 12. In either direction of relative movement between actuator pivot mount 114 and shutter pivot mount 112, as actuator pivot mount 114 passes the center of rotation 116 for shutter pivot mount 112 and shutter 24 the direction of force parallel to shutter actuator 70 reverses direction and shutter 24 snaps to the other bistable state. The component of force provided by torsion spring 88 which is at a right angle to the elongate extent of actuator 70 maintains its direction which tends to locate and seat knife edge 40 in apex 54. Torsion spring 88 together with associated components such as actuator 70 and actuator spring 80 serve as combined shutter bias means for biasing the shutter 24 towards one of the reflective and nonreflective bistable states and as friction bias means for positioning the rotation of shutter 24 on knife edge 40. This combined shutter friction means not only insures bistable states but speeds the translation of shutter 24 between them. FIG. 2 is an illustration of the optical switch 10 in the unactuated condition, where shutter actuator 70 exterior end 74 is basically even with switch housing top 118 of housing 14. First and second light conductors 18,20 are basically parallel as shown in FIG. 1. Second reflector arm 58 is positioned so that reflective surface 68 reflects light into hidden second light conductor 20. In contrast, first reflector arm 56 is disposed so that reflective surface 68 is misaligned to reflect light into first light conductor 18. In FIG. 3 optical switch 10 is shown in the activated position with exterior end 74 of actuator 70 displaced below switch housing top 118 and the alignment of first and second reflector arms 56,58 reversed in the opposite bistable state from FIG. 2. FIGS. 5, 6 and 7 are of general assistance in understanding the contribution of torsion spring 88 with regards to biasing knife edge 40 towards apex 54 and the snap action between the bistable states. Additionally FIGS. 6 and 7 show the role of the reflective and nonreflective flats 42–48. Flats 42–48 are assisted by other stops. Cover reflector stop 120 can provide a rest for reflector 66 of second reflector arm 58 in the nonreflective position. When second reflector arm 58 is in a reflective position a second housing reflector stop 122 tends to maintain it in position. Similarly first reflector arm 56 is supported by first housing reflector stop 124 at the limit of rotation of shutter 24 towards housing 14 where it is in the nonreflective position. Housing reflector stops 122,124, shaped like structural angles, are stop posts which extend towards cover 16 and differ in length so that each abuts their respective reflector arm 56,58 near reflector 66 where switch 10 is in the unactuated position.

Cover 16 includes a plurality of notched posts 126 with the notches 128 at their distal end extending towards housing 14 from the periphery of cover 16. Housing 14 has a matching plurality of notched holes 130 to receive the notched posts 126 and to lock notches 128 on an exposed notch locking surface 132. Notched structure 126–132 serves as fastening means to secure cover 16 to housing 14.

Alignment of cover 16 and housing 14 is provided by tapered posts 134 extending from cover 16 towards housing 14 with their narrowest diameter at their distal end 136. A conformal tapered hole 138 in housing 14 receives tapered posts 134 to align cover 16 on housing 14. This tapered structure 134–138 serves as alignment means which are distinct and separate from the fastening means provided by structure 126–132. Open semicylinder 78 of actuator 70 is partially received on generally semicylindrical actuator shelf 140 of housing 14. The upper surface of actuator shelf 140 acts as an actuator spring abutment 142 for a portion of actuator spring 80 not received within actuator tube 78. Rectangular actuator slot 144 extends towards actuator shelf 140 and terminates at housing actuator stop 146 against which actuator stop 82 bears to set the upper limit of travel for actuator 70. The lower limit of travel is set by interior end 72 bearing against switch housing bottom 148. The switch housing 14 and actuator 70 structure described do not prevent movement of actuator 70 towards the open side of rectangular slot 144. An axial slot 150 extends from exterior end 74 to a median region of open semicylinder 76 on actuator 70. A complimentary actuator rib 152 on cover 16 extends towards housing 14 and interfits with axial slot 150 to prevent actuator 70 from moving towards cover 16. Actuator rib 152 acts in cooperation with actuator slot 144 and actuator shelf 140 to restrain nonaxial movement of actuator 70.

Auxiliary alignment tab 154 provides alignment between optical switch 10 and conformal auxiliary equipment. It is severable from cover 16 when tab 154 is not useful.

As those skilled in the art will readily recognize, some of the invention elements may be interchanged, for example those shown as integral may be separated or those separated may be made integral without adversely affecting the performance of the invention.

From the foregoing description it will be apparent that modifications can be made to the rotational optical switch of the present invention without departing from the teaching of the invention. Also it will be appreciated that the invention has a number of advantages, some of which have been described above and others of which are inherent in the invention. Accordingly, the scope of the invention is only to be limited as is necessitated by the accompanying claims.

We claim:

1. A rotational optical switch comprising:
   a switch enclosure;
   a first light conductor operatively connected to said switch enclosure;
   an optical shutter selectively positioned in a reflective state to reflect light into said first light conductor and a nonreflective state which does not reflect light into said first light conductor pivotally mounted at a captive end to said switch enclosure;
   shutter bias means for biasing said shutter towards one of said reflective and nonrelative states; and
   a shutter actuator operatively connected to said optical shutter to cause said shutter to change states between said reflective and nonreflective states.

2. The optical switch of claim 1 wherein said optical switch rotates between said reflective state and said nonreflective state with a snap action.

3. The optical switch of claim 2 wherein said optical shutter is pivotally mounted to said switch enclosure to incorporate friction reduction means for reducing friction.

4. The optical switch of claim 1 further including:
   minimal surface means for reducing friction providing the pivotal mounting of said optical shutter; and wherein said shutter actuator causes changes between reflective and nonreflective states with a snap action.

5. The optical switch of claim 4 wherein said minimal surface means includes:
   a first shutter pivot arm on said optical shutter having a first pivot knife edge on which said shutter rotates; and
   a first pivot arm hole defined by said switch enclosure receiving said first pivot arm and having a apex in which said first pivot knife edge rotates.

6. The optical switch of claim 4 wherein said minimal surface means includes:
   a second shutter pivot arm on said optical shutter having a second pivot knife edge on which said shutter rotates; and
   a second pivot arm hole defined by said switch enclosure receiving said second pivot arm and having an apex in which said second pivot knife edge rotates.

7. The optical switch of claim 5 wherein said optical switch includes friction bias means for positioning rotation of said first shutter pivot arm on said pivot knife edge.

8. The optical switch of claim 6 wherein said optical switch includes friction bias means for positioning rotation of said second shutter pivot arm on said second pivot knife edge.

9. The optical switch of claim 7 wherein said shutter bias means and said friction reduction bias means are combined shutter friction means for biasing said shutter towards one of said reflective and said nonreflective states and for positioning rotation of said first support cylinder on said pivot knife edge.

10. The optical switch of claim 8 wherein said shutter bias means and said friction bias means are combined shutter friction means for biasing said shutter towards one of said reflective and said nonreflective states and for positioning rotation of said second support cylinder on said second pivot knife edge.

11. The optical switch of claim 1 wherein
    said switch enclosure includes a switch cover and a switch housing;
    said optical shutter includes a reflector at a distal end; and
    said switch cover directly receives said light conductor and includes a cover reflector stop near the terminal end of said light conductor against which said reflector rests in one of said reflective and nonreflective states.

12. The optical switch of claim 1 wherein
    said switch enclosure includes a switch cover and a switch housing;
    said optical shutter includes a reflector at a distal end; and
    said switch housing includes a housing reflector stop against which said shutter rests near said reflector in one of said reflective and nonreflective states.

13. The optical switch of claim 12 wherein said housing reflector stop is a stop post extending towards said cover and abutting said shutter near said reflector.

14. A rotational optical switch comprising:
    a switch enclosure;
    a first light conductor operatively connected to said switch enclosure;
    an optical shutter selectively positioned in a reflective state to reflect light into said first light conductor and a nonreflective state which does not reflect light into said first light conductor pivotally mounted to said switch enclosure and having friction reduction means including a first shutter pivot arm on said optical shutter having a first pivot knife edge on which said shutter rotates and a first pivot arm hole defined by said switch enclosure receiving said first pivot arm and having an apex in which said first pivot knife edge rotates, said shutter rotating between reflective and nonreflective states with a snap action;

shutter bias means for biasing said shutter towards one of said reflective and nonreflective states; and a shutter actuator operatively connected to said optical shutter to cause said shutter to change states between said reflective and nonreflective states.

15. The optical switch of claim 14 wherein said friction reduction means includes:

a second shutter pivot arm on said optical shutter having a second pivot knife edge on which said shutter rotates; and a second pivot arm hole defined by said switch enclosure receiving said second pivot arm and having an apex in which said second pivot knife edge rotates.

16. The optical switch of claim 14 wherein said optical switch includes friction bias means for positioning rotation of said first shutter pivot arm on said pivot knife edge.

17. The optical switch of claim 15 wherein said optical switch includes friction bias means for positioning rotation of said second shutter pivot arm on said pivot knife edge.

18. The optical switch of claim 16 wherein said shutter bias means and said friction reduction bias means are combined shutter friction means for biasing said shutter towards one of said reflective and said reflective states and for positioning rotation of said first shutter pivot arm on said pivot knife edge.

19. The optical switch of claim 17 wherein said shutter bias means and said friction bias means are combined shutter friction means for biasing said shutter towards one of said reflective and said reflective states and for positioning rotation of said first shutter pivot arm on said pivot knife edge.

20. The optical switch of claim 18 wherein said shutter bias means and said friction bias means are combined shutter friction means for biasing said shutter towards one of said reflective and said reflective states and for positioning rotation of said second shutter pivot arm on said pivot knife edge.

21. The optical switch of claim 19 wherein said combined shutter friction means includes:

a torsion spring connected to said optical shutter.

22. The optical switch of claim 20 wherein said combined shutter friction means includes:

a torsion spring connected to said optical shutter.

23. The optical switch of claim 21 wherein said torsion spring includes a shutter end and an actuator end, is connected to said optical shutter adjacent said shutter end, and is connected to said shutter actuator adjacent said actuator end.

24. The optical switch of claim 22 wherein said torsion spring includes a shutter end and an actuator end, is connected to said optical shutter adjacent said shutter end, and is connected to said shutter actuator adjacent said actuator end.

25. The optical switch of claim 23 wherein said connection between said torsion spring adjacent said shutter end and said optical shutter is a shutter pivotal connection; and said connection between said torsion spring adjacent said actuator end and said shutter actuator is an actuator pivotal connection.

26. The optical switch of claim 24 wherein said connection between said torsion spring adjacent said shutter end and said optical shutter is a shutter pivotal connection; and said connection between said torsion spring adjacent said actuator end and said shutter actuator is an actuator pivotal connection.

27. The optical switch of claim 25 further including an actuator bias spring biasing said shutter actuator to unactuated position.

28. The optical switch of claim 26 further including an actuator bias spring biasing said shutter actuator to unactuated position.

29. The optical switch of claim 14 further including:

stop means for positioning said shutter in said reflective position and for positioning said shutter said nonreflective position.

30. The optical switch of claim 15 further including:

stop means for positioning said shutter in said reflective position and for positioning said shutter said nonreflective position.

31. The optical switch of claim 29 wherein said stop means includes:

said first pivot arm having an arm reflective flat extending along and aligned radially with a radius from said first pivot knife edge, and an arm nonreflecting flat; and said first arm hole includes a hole reflective flat against which said arm reflective flat bears if said shutter is in said reflective position and a hole nonreflective flat against which said arm nonreflective flat bears if said shutter is in said nonreflective position.

32. The optical switch of claim 30 wherein said stop means includes:

said second pivot arm having an arm reflective flat extending along and aligned radially with a radius from said second pivot knife edge, and an arm nonreflecting flat; and said second arm hole includes a hole reflective flat against which said arm reflective flat bears if said shutter is in said reflective position and a hole nonreflective flat against which said arm nonreflective flat bears if said shutter is in said non reflective position.

33. The optical switch of claim 31 wherein:

said first pivot arm is generally wedged shaped with said arm reflective and nonreflective flats extending radially outward from said first pivot knife edge; and said first arm hole reflective and nonreflective flats extend outward from an apex in which said first pivot knife edge rotates for at least the length of said first arm reflective flat and said first arm nonreflective flat, respectively.

34. The optical switch of claim 32 wherein:

said second pivot arm is generally wedge shaped with said arm reflective and nonreflective flats extending radially outward from said second pivot knife edge; and said second arm hole reflective and nonreflective flats extend outward from an apex in which said second pivot knife edge rotates for at least the length of said second arm reflective flat and said second arm nonreflective flat, respectively.

35. A rotational optical switch comprising:

a switch enclosure;

a first light conductor operatively connected to said switch enclosure;

a second light conductor operatively connected to said switch enclosure;

an optical shutter including a first reflector and a second reflector each selectively positioned in a reflective state to reflect light into said respective light conductor and a nonreflective state which does not reflect light into said respective light conductor, said states being bistable states for the reflectors, and including a support cylinder, said support cylinder pivotally mounted to said switch enclosure;

shutter bias means for biasing one of said first and said second reflectors towards one of said reflective and nonreflective states; and a shutter actuator operatively connected to said optical shutter to cause said reflectors to change states between said reflective and nonreflective states.

36. The optical switch of claim 35 wherein:
when said first reflector is in a reflective state, said second reflector is in a nonreflective state; and
when said reflector is in a nonreflective state, said second reflector is in a reflective state.

37. The optical switch of claim 36 wherein
said support cylinder has an axial cylinder length exceeding a cylinder diameter and has at each axial end a pivot arm wedged shape and having two sides inclined with respect to each other and meeting at a pivot knife edge; and
said enclosure defines a pair of enclosure pivot arm holes, each said pivot arm hole having an apex for providing support for one of said knife edges.

38. The optical switch of claim 37 wherein said switch further includes:
a first reflector arm extending radially away from said support cylinder and located towards a first axial end of said support cylinder, said first reflector mounted towards a distal end of said first reflector arm; and
a second reflector arm extending radially away from said support cylinder and located towards a second axial end of said support cylinder, said second reflector mounted towards a distal end of said second reflector arm.

39. The optical switch of claim 37 wherein
said support cylinder has shutter limit flats at each axial end of said support cylinder, said flats on each pivot arm extending radially from a pivot knife edge; and
said enclosure pivot arm holes have corresponding hole limit flats extending radially from a hole apex;
said shutter limit flats and said hole limit flats cooperating to delimit rotation of said support cylinders and fix the position of the reflectors in one of their bistable states.

40. The optical switch of claim 38 wherein said shutter bias means includes:
a torsion spring having a coiled end, a spring actuator end and a spring shutter end and is pivotally connected to said shutter actuator at said spring actuator end, and pivotally connected to said shutter at said spring shutter end.

41. The optical switch of claim 40 wherein:
said optical shutter pivotal mounting is translationally fixed with respect to said enclosure;
said support cylinder includes a shutter pivot mount on the surface of said support cylinder providing the pivotal connection of said torsion spring;
said shutter actuator reciprocates with respect to said switch enclosure and with respect to said shutter pivot mount, said shutter actuator has an actuator pivot mount providing the pivotal connection of said torsion spring;

when said actuator pivot mount translates past a center of rotation of said shutter, the component of force providing shutter bias which positions said reflectors in one bistable state reverses direction causing said reflectors to rapidly translate to the other bistable state.

42. The optical switch of claim 41 wherein a component of force provided by said torsion spring tends to locate and maintain said pivot knife edges in said pivot arm hole apexes.

43. The optical shutter of claim 23 wherein
said switch enclosure includes a switch cover and a switch housing;
said first and said second reflectors are adjacent to a distal end of said shutter;
said switch housing includes a housing first and a housing second reflector stop against which said shutter rests near said reflector in one of said reflective and nonreflective states.

44. The optical switch of claim 43 wherein
said first and said second housing reflector stops are first and second stop posts extending towards said cover, and where the length of extension of said posts differ so that both reflectors are supported in one of said reflective and nonreflective states.

45. A rotational optical switch comprising:
a switch enclosure;
a first light conductor operatively connected to said switch enclosure;
a second light conductor operatively connected to said switch enclosure;
an optical shutter including a first reflector and a second reflector each selectively positioned in a reflective state to reflect light into said respective light conductor and a nonreflective state which does not reflect light into said respective light conductor, when said first reflector is in a reflective state, then said second reflector is in a nonreflective state, when said first reflector is in a nonreflective state, said second reflector is in a reflective state said states being bistable states for the reflectors, and including a support cylinder, said support cylinder pivotally mounted to said switch enclosure and having a cylinder length exceeding a cylinder diameter, but has at each axial end a pivot arm having two sides inclined with respect to each other and meeting at a pivot knife edge;
said enclosure defines a pair of enclosure pivot arm holes, each said pivot arm hole having an apex for providing support for one of said knife edges
a first reflector arm extending radially away from said support cylinder and located towards a first axial end of said support cylinder, said first reflector mounted towards a distal end of said first reflector arm;
a second reflector arm extending radially away from said support cylinder and located towards a second axial end of said support cylinder, said second reflector mounted towards a distal end of said second reflector arm;
each said first and second reflector arm having;
a first radial reflector arm extending radially outward from said support cylinder;

a displacement arm angled in the plane of rotation of said support cylinder and extending outward from said first radial reflector arm;

a second radial reflector arm extending approximately parallel to said first radial reflector arm and outward from said displacement arm and to which a reflector is mounted, said displacement arms appropriately angled in the plane of rotation for a sufficient distance to cause said fist and second reflectors to be in opposite reflective states when the reflectors are in a bistable state;

shutter bias means for biasing one of said first and said second reflectors towards one of said reflective and nonreflective states; and a shutter actuator operatively connected to said optical shutter to cause said reflectors to change states between said reflective and nonreflective states.

46. The optical switch of claim 45 wherein each said first and second reflector includes:

a reflective switch facing towards said support cylinder and extending axially inward towards opposite axial end of said support cylinder.

* * * * *